July 23, 1940.	M. C. HJELTE	2,209,295
FRUIT CUTTING DEVICE
Filed Sept. 8, 1938
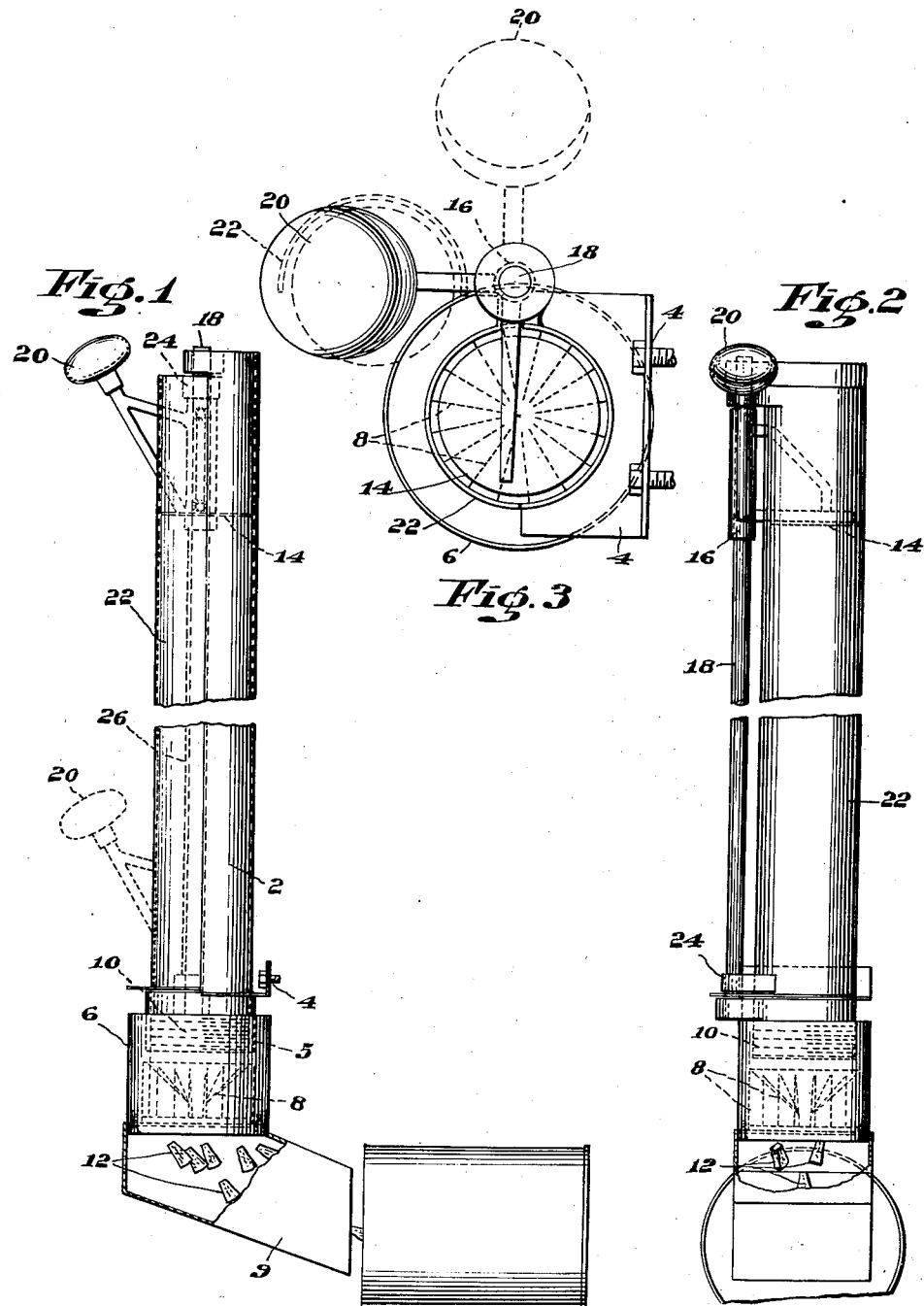
INVENTOR
Marshall C. Hjelte
BY H. S. Kirkpatrick
ATTORNEY Patented July 23, 1940

2,209,295

UNITED STATES PATENT OFFICE 2,209,295

FRUIT CUTTING DEVICE

Marshall C. Hjelte, Honolulu, Territory of Hawaii, assignor to Hawaiian Pineapple Company, Limited, Honolulu, Territory of Hawaii, a corporation of Hawaii Application September 8, 1938, Serial No. 228,969

6 Claims. (Cl. 146—6)

This invention relates to a machine for cutting whole slices of pineapple into a given number of uniform or perfect segments and discharging the same into a suitable conveyer.

Heretofore various machines have been employed for cutting slices of pineapple but none of them possess the advantages of the present invention, as will hereinafter more fully appear. Specifically, the present invention provides a simple apparatus with relatively few moving parts whereby the operator, by what amounts to a single movement of the control handle, both closes the device and cuts the slices of pineapple into uniform segments, and, by an opposite movement of the same handle opens the device and makes it ready for another charge of whole slices to be cut into segments.

The invention is illustrated in the accompanying drawing in which:

Fig. 1 is a side elevation;

Fig. 2 is a plan view looking down upon the device as shown in Fig. 1; and

Fig. 3 is an end elevation slightly enlarged.

Referring to the drawing showing the preferred structure and in which like numerals represent like parts, the entire assembly is mounted on a trough 2 which in itself provides the necessary stiffness for the structure and may be suitably affixed as indicated by the bracket and bolt at 4 to a table or underlying supporting frame (not shown). The trough 2 has affixed thereto at the end thereof an annular section 5 leading into a cutter head and housing 6, the latter having mounted therein a series of radially arranged fixed knives 8 so that the entire slices may be divided into the desired number of uniform segments 12 upon movement of the slices 10, Figs. 1 and 2, against and through the knives 8, whence the segments pass through the closed hopper 9 into a suitable container.

The radially arranged knives 8 are self-cleaning in that they have their cutting edges sloped inwardly and towards the discharge end of the head, the cutting edges being of such length as to extend at their inner ends into the void or cored hole in the center of the annular slices of fruit passing through the head of the machine. This design permits any minute uncut fruit fibres to be continuously pushed off the knife edge as succeeding slices of cored fruit are forced through the cutting head.

The advance of the slices is accomplished manually through the medium of a pusher plate 14 which is affixed, as shown in the drawing, to a sleeve 16 sliding on the rod 18 affixed along but spaced from the trough 2. A handle 20 is attached to the sleeve 16 so as to actuate it and the pusher plate 14 and thus push the annular slices 10 along the trough from the position at the right-hand or further end of the trough, as shown in Fig. 1, to the indicated position of the handle shown in dotted lines at the left or opposite end of the trough (Fig. 1).

In addition to its function of pushing the whole slices of pineapple lengthwise of the trough, the handle 20 with its sleeve 16 is rotatable about the rod 18 as an axis so as to oscillate the pusher plate 14, and through its connections thereto, swing open the trough cover 22 of the trough 2, the trough cover 22 being swingably mounted about the rod 18 by clips 24 at the opposite ends thereof so as to swing to the position shown in dotted lines in Fig. 3. To permit the lengthwise movement of the pusher plate and its connections to the sleeve 16 along the trough 2, the edge of the trough cover 22 adjacent the rod 18 is spaced from the trough 2 as indicated at 26 so as to provide a slot between and throughout the length of the trough 2 and trough cover 22. Because of this construction and arrangement, the operator need give no thought to the swingable trough cover but, instead, merely actuate the handle 20 to and fro giving it an oscillating movement at the beginning of each feeding stroke so as to close the trough cover to provide an enclosed trough to hold and guide the slices 10 as they are forced towards the knives 8—and thus prevent any possible displacement of the slices being fed—and then on the return movement swing open the trough cover so as to expose the trough 2 and make it ready for another charge of slices of pineapple. It will thus be seen that I have provided a simple, effective, and easily operated device for cutting annular slices of pineapple into segments.

Having described the invention, what is claimed is:

1. A machine for cutting from annular slices of pineapple uniform segmental portions having, in combination, a semi-circular trough adapted to hold in face-to-face relation a series of slices to be cut, a series of radially arranged knives so affixed at the end of said trough as to cut into segments slices of pineapple thrust thereagainst along said trough, said knives having their cutting edges sloped inwardly and towards the discharge end and extending at their inner edges into the center void of the annular slices of pineapple, a slice pusher member mounted on an external longitudinal rod for slidable movement along said